(12) United States Patent
Kounobu et al.

(10) Patent No.: US 7,257,924 B2
(45) Date of Patent: Aug. 21, 2007

(54) WEATHER STRIP FOR AUTOMOBILE

(75) Inventors: Tsuyoshi Kounobu, Hiroshima (JP);
Toshinari Tennoh, Hiroshima (JP)

(73) Assignee: Nishikawa Rubber Co., Ltd.,
Hiroshima-shi (JP)

( * ) Notice: Subject to any disclaimer, the term of this patent is extended or adjusted under 35 U.S.C. 154(b) by 153 days.

(21) Appl. No.: 10/955,784

(22) Filed: Sep. 30, 2004

(65) Prior Publication Data

US 2005/0072052 A1  Apr. 7, 2005

(30) Foreign Application Priority Data

Oct. 6, 2003 (JP) ............... 2003-347535
Aug. 2, 2004 (JP) ............... 2004-225066

(51) Int. Cl.
*E06B 7/16* (2006.01)
(52) U.S. Cl. .................. 49/490.1; 49/475.1
(58) Field of Classification Search ........... 49/475.1, 49/490.1, 498.1
See application file for complete search history.

(56) References Cited

U.S. PATENT DOCUMENTS

| | | | | |
|---|---|---|---|---|
| 4,676,856 A | * | 6/1987 | Shigeki et al. ............ 156/201 |
| 4,830,898 A | * | 5/1989 | Smith ....................... 428/122 |
| 5,686,165 A | * | 11/1997 | Cook ........................ 428/122 |
| 5,741,573 A | * | 4/1998 | Malm ......................... 428/83 |
| 6,395,371 B1 | * | 5/2002 | Nozaki et al. ............. 428/122 |
| 6,548,143 B1 | * | 4/2003 | Heller ....................... 428/122 |
| 6,652,952 B2 | * | 11/2003 | Drozd et al. .............. 428/122 |
| 6,972,140 B2 | * | 12/2005 | Watanabe ................. 428/36.9 |
| 2002/0092242 A1 | * | 7/2002 | Hope ........................ 49/475.1 |
| 2004/0043188 A1 | * | 3/2004 | Tsujiguchi ................. 428/122 |

FOREIGN PATENT DOCUMENTS

JP    2001-009889 A    1/2001

* cited by examiner

*Primary Examiner*—Gregory J. Strimbu
(74) *Attorney, Agent, or Firm*—Frishauf, Holtz, Goodman & Chick, P.C.

(57) ABSTRACT

A weather strip for an automobile includes an insert body which is made of resin and which includes a plurality of tooth portions and gaps formed between the tooth portions such that the insert body is roughly comb shaped. A filler at least partially fills the gaps between the tooth portions and which is made of a thermoplastic elastomer or a thermoplastic resin having a Shore A hardness of 20 to 90 (preferably 40 to 70). A weather strip material covers the insert body and the filler such that the insert body, with the filler in the gaps thereof, is embedded in the weather strip material, and the weather strip material does not constitute the filler. An elongation after fracture of the thermoplastic elastomer or thermoplastic resin is at least 300%.

10 Claims, 4 Drawing Sheets

WEATHER STRIP FOR AUTOMOBILE

BACKGROUND OF THE INVENTION

1. Field of the Invention

This invention relates to a weather strip for an automobile which embeds a resin made insert therein.

2. Description of the Prior Art

As illustrated in FIGS. 7 and 8, a conventional weather strip for an automobile, which comprises a main body 30 made of EPDM rubber, has a comb shaped insert 40 embedded therein in order to improve its grabbing force against a body panel and the like. Recently, inserts 40 made of resin have been used instead of metal inserts from a point of view in productivity, weight saving and the like. Such art is disclosed in, for example, Japanese Unexamined Patent Publication No. 2001-9889.

However, the conventional weather strip, which includes a main body 30 made of EPDM rubber having a comb-shaped resin insert 40 embedded therein, encounters a problem whereby a concave-convex surface (which is formed by concave portions 60 and convex portions 70) is formed on the surface thereof, thereby severely damaging its appearance.

Such problem arises because the resin made insert differs from the conventional metal made insert in its structure. That is, the metal made insert has a thickness of only 0.4 mm to 0.5 mm, whereas the resin made insert has a larger thickness ranging from 1 mm to 2 mm in order to secure its rigidity. Therefore, for the reason that the resin made insert is thicker than the conventional metal made insert, at a time EPDM rubber is injected over the resin made insert in a mold, the gaps 50 of the insert cannot be fully filled with the EPDM rubber, thereby forming considerably thinner portions on the surface over the gaps 50 compared to the rest of the surface under which the insert takes place.

It is therefore an object of this invention to provide a rubber made weather strip embedding a resin made insert which does not form a concave-convex surface on a surface of a main body of a weather strip and therefore is good in appearance.

SUMMARY OF THE INVENTION

In order to achieve the above-mentioned object, according to one aspect of the present invention a weather strip for an automobile is provided that has an insert (3) embedded therein which includes a roughly comb shaped insert body (4) which is made of resin and has a plurality of tooth portions (4*b*). Gaps (50) formed between the tooth portions (4*b*) of the insert body (4) are fully or partially filled with a filler (5) which is made of thermoplastic elastomer or thermoplastic resin having Shore A hardness of 20 to 90 (preferably 40 to 70)

In addition, according to an aspect of the present invention an elongation after fracture of the thermoplastic elastomer or thermoplastic resin forming the filler is 300% or more.

It should be noted that each numeral in parenthesis indicates a corresponding element or matter described in the drawings and the after-mentioned preferred embodiments of the invention.

With the structure of there present invention, the gaps formed between the tooth portions of the insert body are fully or partially filled with the filler made of thermoplastic elastomer or thermoplastic resin having a Shore A hardness of 20 to 90 (preferbaly 40 to 70), so that a surface of the main body of the weather strip does not form a concave-convex surface, thereby providing a good appearance.

That is, the insert is roughly flat as it is formed with the insert body and the filler filled in the gaps, so that it is unneeded to fill the gaps with EPDM rubber. Therefore, the EPDM rubber forms an uniform layer having a similar thickness over the insert, so that the insert forms a flat surface therearound excluding an appearance of concave portions 60 and convex portions 70.

The thermoplastic elastomer or the thermoplastic resin forming the filler has Shore A hardness of 20 to 90 (preferably 40 to 70), so that a bending operation of the insert can be done easily while bending the insert into a roughly U-shaped form.

Further, a bending operation of the weather strip can also be performed easily, which is applied in bending the weather strip along a round corner portion of an automobile. Therefore, the weather strip is good in a so called "Bending radii".

In addition, if the elongation after fracture of the thermoplastic elastomer or the thermoplastic resin forming the filler is 300% or more, the weather strip is good in flexibility in a bending operation ("Bending radii").

Therefore, the bending operations of the insert as well as the weather strip can be performed more easily.

DESCRIPTION OF PREFERRED EMBODIMENT

Figure 1:
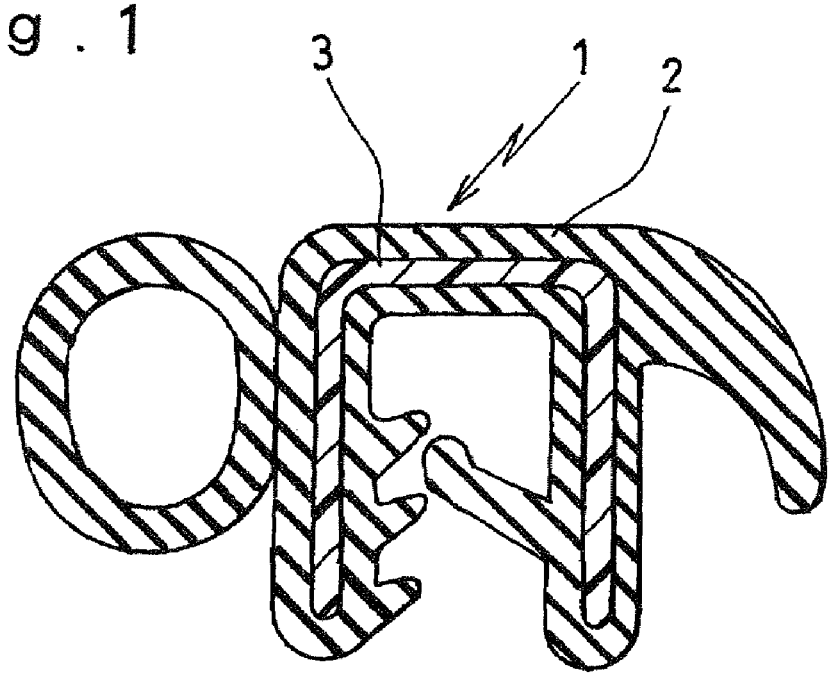
FIG. 1 is a sectional view showing a weather strip according to a preferred embodiment of the invention.
Figure 2:
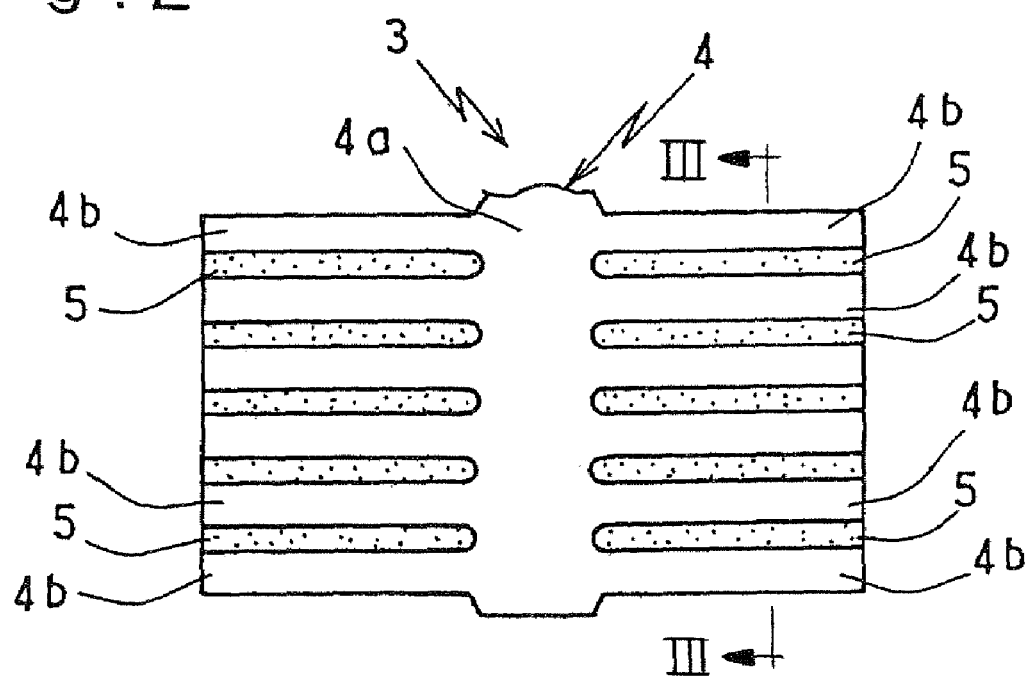
FIG. 2 is an expanded plan view showing an insert to be embedded in the weather strip shown in FIG. 1.
Figure 3:
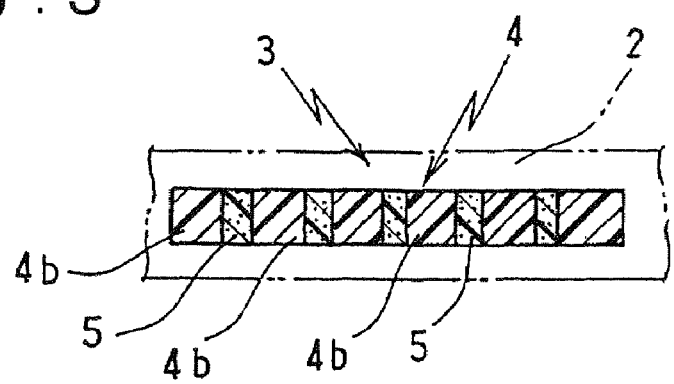
FIG. 3 is a sectional view along line III-III in FIG. 2

A weather strip for an automobile according to the invention will be described hereinafter referring to FIGS. 1 to 3. FIG. 1 is a sectional view showing the weather strip 1. FIG. 2 is an expanded plain view showing an insert 3 embedded in the weather strip 1. FIG. 3 is a sectional view along line III-III in FIG. 2. Same numerals are provided in portions which are similar to the portions shown in the conventional art.

A weather strip 1 for an automobile according to the preferred embodiment comprises a rubber made main body 2 and an resin made insert 3 which is embedded in the main body 2. The insert 3 comprises a insert body 4 and a filler 5. The insert body 4 comprises a base portion 4*a* which elongates in a longitudinal direction and a plural number of tooth portions 4*b* provided at both sides of the base portion 4*a*, thus forming a roughly comb shaped form. The filler 5 is filled in a plural number of the gaps 50 formed between the tooth portions 4*b*. The filler 5 is made of thermoplastic elastomer (TPE) [TPO: olefin type thermoplastic elastomer, TPS: styrene type thermoplastic elastomer, or TPVC: vinyl chloride type thermoplastic elastomer] having Shore A hardness of 20 to 90 (preferably 40 to 70).

The insert 4 is made of polypropylene and it may be formed by adding talc. Each gap 50 has a width of about 0.5 mm to 5 mm.

Figure 4:
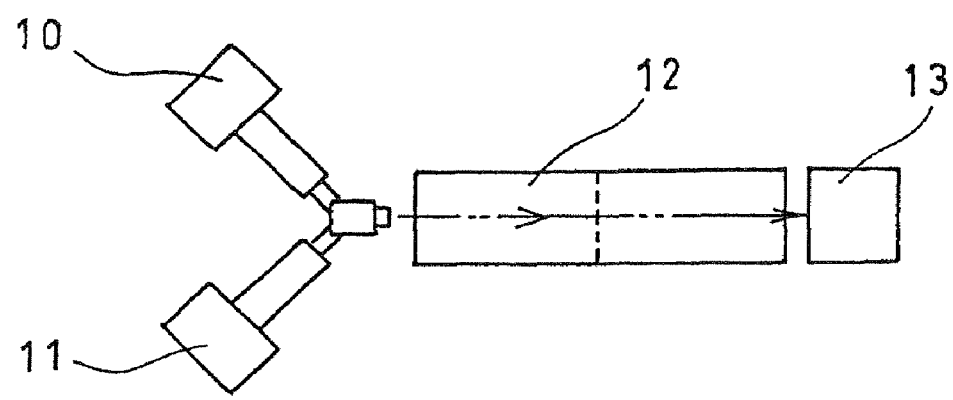
FIG. 4 is an explanatory drawing showing a forming method of a weather strip according to the invention.
Figure 5:
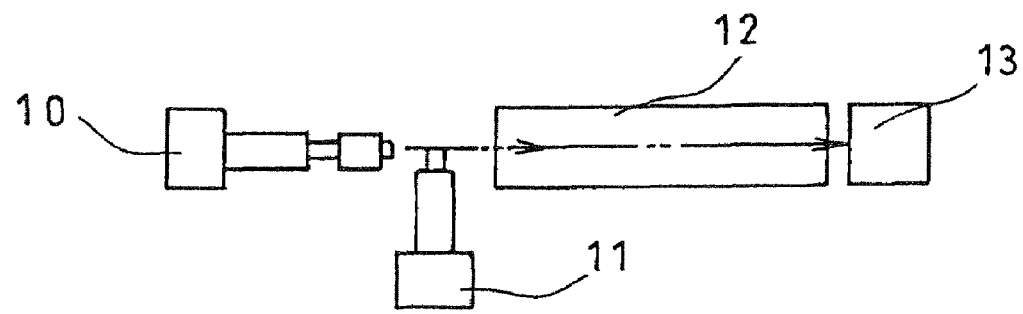
FIG. 5 is an another explanatory drawing showing a forming method of a weather strip according to the invention.

As illustrated in FIGS. 4 and 5, this weather strip 1 for an automobile can be formed with an insert extruder 10 which extrudes the insert body 4, a filler extruder 11 which fills the filler 5 in the gaps 50, a cooling water pool 12 in which the weather strip 1 is dipped, and a pulling machine 13 which pulls up the weather strip 1.

According to the weather strip 1 for an automobile in the preferred embodiment, the gaps 50 of the insert body 4 are filled with the filler 5, so that it does not form a concave-convex surface on its surface, and that it is good in appearance.

The thermoplastic elastomer forming the filler 5 is a soft material having Shore A hardness of 20 to 90 (preferably 40 to 70), so that a bending operation can be performed easily while bending the insert 3 into a roughly U-shaped form. Similarly, a bending operation of the weather strip 1 can also be done easily while bending the weather strip 1 along a corner portion of an automobile.

Further, according to this weather strip 1, an elongation after fracture of the thermoplastic elastomer forming the filler 5 is 300% or more, so that it is excellent in flexibility at a time of bending operation.

Therefore, the bending operations of the insert 3 as well as the weather strip 1 can be done more easily.

It should be noted that if the thermoplastic elastomer forming the filler 5 has Shore A hardness of less than 20, when the rubber is injected over the insert 3 in a mold, there is formed a concave-convex surface on the surface of the weather strip 1 as the filler 5 is hardly oppressed by the rubber, thereby deteriorating its appearance. On the other hand, if Shore A hardness of the thermoplastic elastomer is more than 90, the flexibility of the filler 5 decreases and so "Bending radii" decreases. The weather strip 1 for an automobile according to the preferred embodiment of the invention comprises the thermoplastic elastomer having a proper hardness, so that it does not induce the problems mentioned above. When the thermoplastic elastomer having Shore A hardness of 40 to 70 is used, there can be formed a weather strip having both a good design and flexibility.

Figure 6:
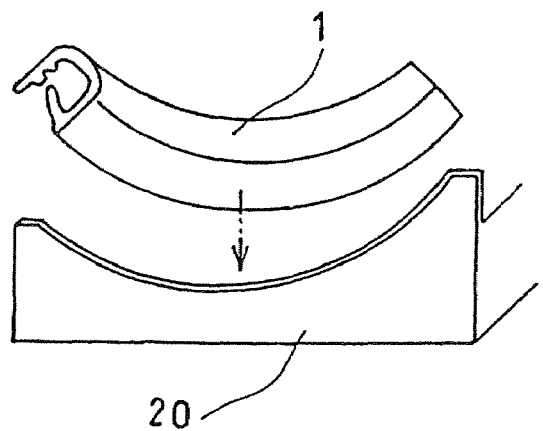
FIG. 6 is an explanatory drawing showing a manner of an experimental test on "Bending radii" of a weather strip.
Figure 7:
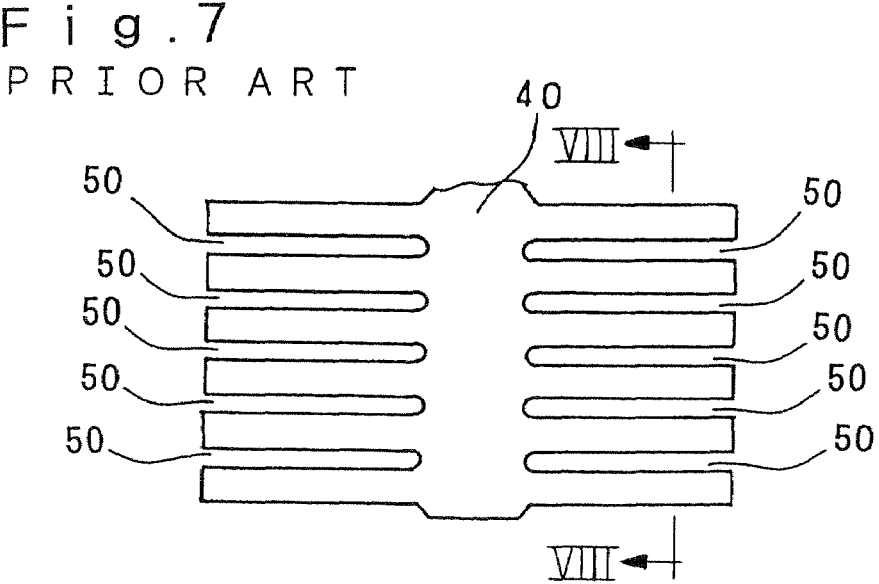
FIG. 7 is an expanded plan view showing an insert to be embedded in a conventional weather strip.
Figure 8:
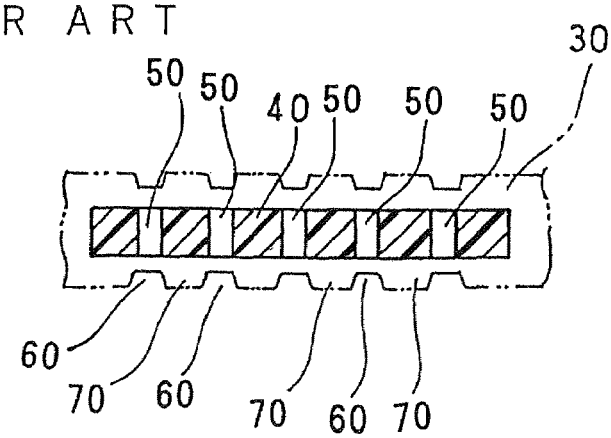
FIG. 8 is a sectional view along line VIII-VIII in FIG. 7.

The inventors of this invention made experimental test to compare a weather strip according to the invention and a conventional weather strip on a presence or absence of a formation of a concave-convex surface as well as "Bending radii". The experimental test of "Bending radii" was completed using a round-shaped jig 20 as shown in FIG. 6.

The results of the experimental test is demonstrated in Table 1.

TABLE 1

|  | TPE filled in the gaps of a weather strip | | | | | Degree of concave and convex | Minimum radius of a jig[*2)] | Evaluation |
|---|---|---|---|---|---|---|---|---|
|  | Classification | Supplier | Brand | Grade | Hardness | | | |
| Comparative example 1[*1)] | EPDM | — | — | — | — | — Large | 25 | X |
| Comparative example 2 | TPS | Riken Technos | Actymer | AE-2010S | Shore A 10 | Large | 25 | X |
| Comparative example 3 | TPO | Mitsui Chemicals | Milastomer | M4400B | Shore D 48 | Small | 70 | X |
| Embodiment 1 | TPS | Riken Technos | Actymer | AE-2020S | Shore A 20 | Small | 30 | ○ |
| Embodiment 2 | TPO | Mitsui Chemicals | Milastomer | 7030B | Shore A 70 | Small | 50 | ○ |
| Embodiment 3 | TPVC | Advanced Plastics Compounds | Sunprene | FE65HG | Shore A 65 | Small | 40 | ○ |
| Embodiment 4 | TPS | Riken Technos | Actymer | AE-2040S | Shore A 40 | Small | 35 | ○ |
| Embodiment 5 | TPO | Mitsui Chemicals | Milastomer | 9070B | Shore A 90 | Small | 55 | ○ |

TPO: olefin type thermoplastic elastomer
TPS: styrene type thermoplastic elastomer
TPVC: vinyl chloride type thermoplastic elastomer
○: We have No problems in actual use.
X: there are problems in actual use.
[*1)]Only EPDM is applied over a conventional resin made insert (TPE is not filled in the gaps of an insert).
[*2)]Minimum limited radius of a corner of each weather strip is measured by a measuring method shown in FIG. 6 within a range in which each weather strip enabled to maintain its good bent structure.

As it is evident from the results shown in Table 1, the weather strips according to the invention (which are indicated as "embodiment 1" to "embodiment 5" in the Table) form smaller a concave-convex surface, and "Bending radii" is also smaller ranging between 30 mm to 55 mm, thereby indicating that they are also better suited in a practical use compared to the conventional weather strips (which are shown as "comparative example 1" to "comparative example 3" in the Table). Further, it is presumed from this experimental test that if Shore A hardness of the thermoplastic elastomer forming a filler 5 exceeds 90, the flexibility thereof decreases, thereby deteriorating the flexibility of a weather strip in forming the weather strip in a bending operation and the like.

Although, in this preferred embodiment, only EPDM is taken as an example of a rubber which embeds an insert 3 therein, other materials such as natural rubber, styrene butadiene rubber, silicon rubber, fluorine rubber and nitrilebutadiene rubber can be considered as the materials in use. Further, instead of the rubber material such as EPDM, thermoplastic elastomer can be applied.

Moreover, in this preferred embodiment, there is exemplified polypropylene as a thermoplastic resin for a material of an insert 4, other materials such as polyethylene, polystyrene and polyamide can be utilized.

Further, in this preferred embodiment, as a forming material of the filler 5, there can be used olefin type, styrene type and vinyl chloride type as thermoplastic elastomer, and there can be used ethylene-vinyl-acetate and flexible polyvinyl chloride as the thermoplastic resin.

Figure 9:
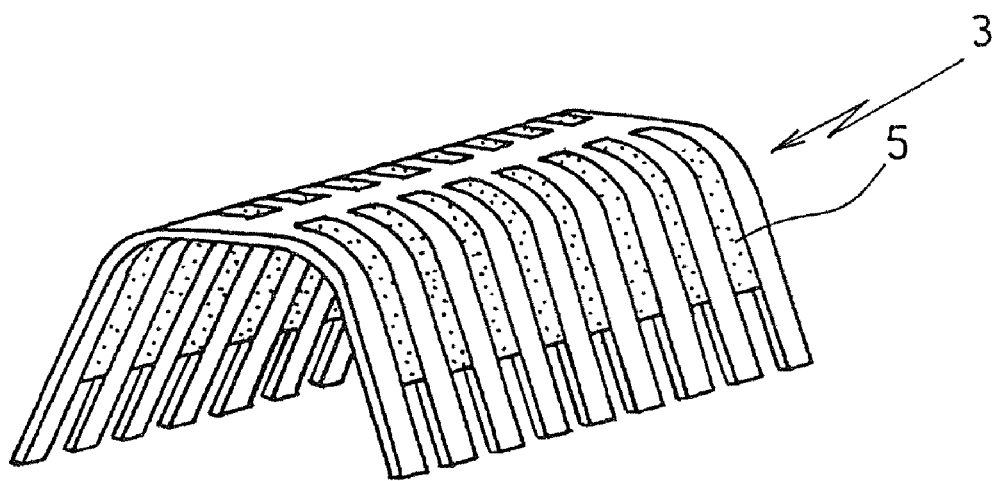
FIG. 9 is a perspective view showing another insert according to the invention.

Furthermore, although in this preferred embodiment, the filler 5 is fully filled in all of the gaps 50 formed between the tooth portions 4b of the insert body 4 as illustrated in FIG. 2, the filler 5 may be partially filled in the gaps 50 as such as shown in FIG. 9, wherein the filler 5 is filled in the gaps 50 excluding the portions between the top edge portions of the tooth portions 4b. The rubber, which will be provided over the insert 3, will be filled in the portions where the filler 5 is unfilled.

Figure 10:
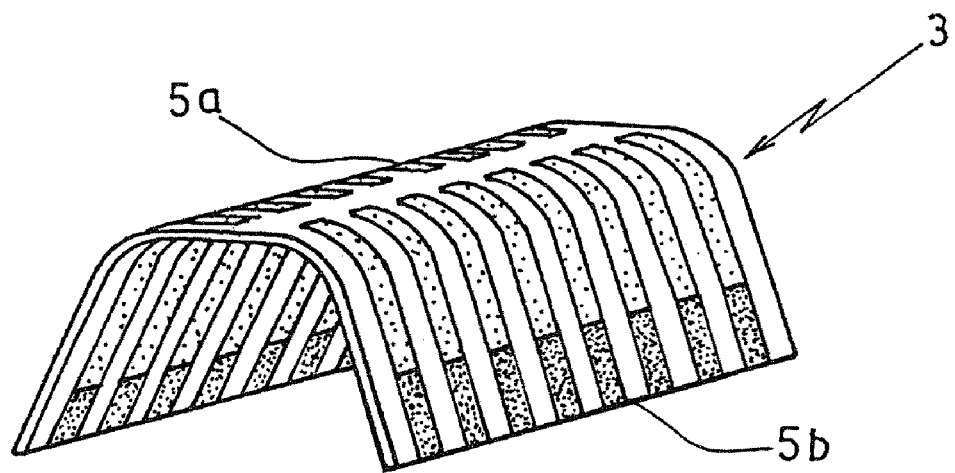
FIG. 10 is a perspective view showing still another insert according to the invention.

Further, another filler 5 can be filled in the portions of the gaps 50 between the top edge portions of the tooth portions 4b where the former filler 5 is unfilled. For example, as illustrated in FIG. 10, one type of thermoplastic elastomer TPE 5b having a lower hardness (of, for example, 20 to 50 in Shore A hardness) can be filled in the gaps 50 between the top edge portions of the tooth portions 4b to contribute the flexibility. Further, another type of thermoplastic elastomer TPE 5a having a higher hardness (of, for example, 50 to 90 in Shore A hardness) can be filled in the gaps 50 excluding the portions between the top edge portions of the tooth portions 4b (,which will become a design surface observed from outside).

We claim:

1. A weather strip for an automobile, comprising:
   an insert body which is made of resin and which includes a plurality of tooth portions and gaps formed between the tooth portions such that the insert body is roughly comb shaped;
   a filler which at least partially fills the gaps between the tooth portions and which is made of a thermoplastic elastomer or a thermoplastic resin which is different from said resin of said insert body, and said filler having a Shore A hardness of 20 to 90; and
   a weather strip material which covers the insert body and the filler such that the insert body, with the filler in the gaps thereof, is embedded in the weather strip material;
   wherein the weather strip material does not constitute the filler, and the filler is provided only in the gaps between the tooth portions.

2. The weather strip according to claim 1, wherein an elongation after fracture of the thermoplastic elastomer or the thermoplastic resin forming the filler is at least 300%.

3. The weather strip according to claim 1, wherein the thermoplastic elastomer or the thermoplastic resin, which forms the filler, has a Shore A hardness of 40 to 70.

4. The weather strip according to claim 1, wherein the insert body comprises a base portion from which the tooth portions extend.

5. The weather strip according to claim 4, wherein the filler is provided in each said gap to extend from the base portion to a position that is between the base portion and tips of the tooth portions, along a direction in which the tooth portions extend from the base portion, such that the filler does not extend pass said position between the base portion and the tips of the tooth portions along the direction in which the tooth portions extend from the base portion.

6. The weather strip according to claim 4, wherein the filler is provided in each said gap to extend from the base portion to tips of the tooth portions.

7. The weather strip according to claim 4, wherein the filler includes: (i) a first filler material that is provided in each said gap to extend from the base portion to a position that is between the base portion and tips of the tooth portions, along a direction in which the tooth portions extend from the base portion, and (ii) a second filler material which fills a portion of each said gap that is not filled by the first filler material.

8. The weather strip according to claim 7, wherein a hardness of the second filler material is lower than a hardness of the first filler material.

9. The weather strip according to claim 8, wherein the first filler material is a thermoplastic elastomer or a thermoplastic resin having a Shore A hardness of 50 to 90, and the second filler material is a thermoplastic elastomer or a thermoplastic resin having a Shore A hardness of 20 to 50.

10. The weather strip according to claim 1, wherein the insert body has a thickness in a range of 1 mm to 2 mm.

* * * * *